United States Patent
Manko et al.

(10) Patent No.: US 8,260,748 B1
(45) Date of Patent: Sep. 4, 2012

(54) METHOD AND APPARATUS FOR CAPTURING DATA FROM A BACKUP IMAGE

(75) Inventors: Eugene Paul Manko, Auckland (NZ);
Timothy Allan Wayper, Albany (NZ);
Robert Edwin Stutton, Sandy, UT (US)

(73) Assignee: Symantec Corporation, Mountain View, CA (US)

( * ) Notice: Subject to any disclaimer, the term of this patent is extended or adjusted under 35 U.S.C. 154(b) by 279 days.

(21) Appl. No.: 11/728,756

(22) Filed: Mar. 27, 2007

(51) Int. Cl.
*G06F 7/00* (2006.01)
*G06F 17/00* (2006.01)

(52) U.S. Cl. ................ 707/645; 707/674; 714/15

(58) Field of Classification Search ........... 707/200, 707/201, 202, 203, 204, 640, 645, 650, 674; 714/6, 13, 19, 15
See application file for complete search history.

(56) References Cited

U.S. PATENT DOCUMENTS

| | | | | |
|---|---|---|---|---|
| 5,485,606 A * | 1/1996 | Midgdey et al. | ........ | 707/10 |
| 5,535,371 A * | 7/1996 | Stewart et al. | ........ | 703/25 |
| 5,870,761 A * | 2/1999 | Demers et al. | ........ | 707/201 |
| 5,907,672 A * | 5/1999 | Matze et al. | ........ | 714/6.13 |
| 5,941,963 A * | 8/1999 | Charles et al. | ........ | 710/62 |
| 6,012,130 A * | 1/2000 | Beyda et al. | ........ | 711/173 |
| 6,016,553 A * | 1/2000 | Schneider et al. | ........ | 714/21 |
| 6,535,998 B1 * | 3/2003 | Cabrera et al. | ........ | 714/15 |
| 6,543,004 B1 * | 4/2003 | Cagle et al. | ........ | 714/15 |
| 6,611,850 B1 * | 8/2003 | Shen | ........ | 707/999.204 |
| 6,658,435 B1 * | 12/2003 | McCall | ........ | 711/162 |
| 6,993,679 B2 * | 1/2006 | George | ........ | 714/6.13 |
| 7,032,011 B2 * | 4/2006 | Woodard et al. | ........ | 709/220 |
| 7,036,043 B2 * | 4/2006 | Martin et al. | ........ | 714/19 |
| 7,100,072 B2 * | 8/2006 | Galipeau et al. | ........ | 714/6 |
| 7,130,973 B1 * | 10/2006 | Chong et al. | ........ | 711/162 |
| 7,328,325 B1 * | 2/2008 | Solis et al. | ........ | 711/202 |
| 7,478,117 B1 * | 1/2009 | Lamb et al. | ........ | 707/999.204 |
| 7,610,320 B2 * | 10/2009 | Passerini et al. | ........ | 707/999.204 |
| 7,634,497 B2 * | 12/2009 | Passerini et al. | ........ | 707/999.102 |
| 2004/0193953 A1 * | 9/2004 | Callahan et al. | ........ | 714/15 |

OTHER PUBLICATIONS

Scott Schnoll, Microsoft Exchange Server 2003 Distilled, Mar. 16, 2003, Addison-Wesley Professional, First Edition, Chapter 3, Where Did it go?*
Paul McFedries, Microsoft Windows Vista Unveiled, Jun. 9, 2006, First Printing, Chapters 5 & 8.*

* cited by examiner

*Primary Examiner* — James Trujillo
*Assistant Examiner* — Pavan Mamillapalli
(74) *Attorney, Agent, or Firm* — Campbell Stephenson LLP

(57) ABSTRACT

Method and apparatus for capturing data from a backup image are described. In one example, the backup image is mounted on a volume in a host computer. The backup image includes files, a first portion of which include an operating system. A database in the backup image is mounted. The database stores configuration data for use by the operating system. The configuration data includes file paths referencing at least one of the files. The file paths are re-mapped based on the volume. The data is captured from the backup image using the database as mounted and the file paths as re-mapped.

20 Claims, 3 Drawing Sheets

METHOD AND APPARATUS FOR CAPTURING DATA FROM A BACKUP IMAGE

BACKGROUND OF THE INVENTION

1. Field of the Invention

Embodiments of the invention generally relate to computers. More specifically, this disclosure relates to a method and apparatus for capturing data from a backup image.

2. Description of the Related Art

Computer systems and their components are subject to various failures that may result in the loss of data. For example, a storage device used in or by the computer system may experience a failure (e.g., mechanical, electrical, magnetic, etc.) that may make any data stored on the device unreadable. Erroneous software or hardware operation may corrupt the data stored on a storage device and effectively destroy the data stored on an otherwise properly functioning storage device. To mitigate the risk of losing data, a computer system may include backup software for making backup copies of data stored on various storage devices. Backups are typically made periodically according to a schedule. The data may be backed up initially to disk-based storage and then migrated to an archival storage, such as tape-based storage.

On occasion, a user's disk drive may fail. If they have backup software that performed one or more backups of the data on the disk drive, the user can use the backup(s) to restore their entire operating environment to a new disk drive. In some cases, however, the user may not desire to restore the entire operating environment, but rather only selected data, such as selected files (e.g., documents, digital photos, music files, etc.) and/or application settings (e.g., configured fonts, file shortcuts, "task bar" configuration, "wallpaper" setting, etc.). Furthermore, the user may desire to restore the selected data to a dissimilar operating environment from the previous operating environment stored on the failed disk drive. For example, the user may install a new operating system on the new disk drive, and may potentially install new and/or upgraded software applications. One technique for extracting selected data from the backup is to manually extract the data using the backup software. However, such manual extraction is a tedious process for files and nearly impossible for application settings. Accordingly, there exists a need in the art for a method and apparatus for capturing data from a backup image that overcomes the above-described problems.

SUMMARY OF THE INVENTION

Method and apparatus for capturing data from a backup image are described. In one embodiment, the backup image is mounted on a volume in a host computer. The backup image includes files, a first portion of which include an operating system. A database in the backup image is mounted. The database stores configuration data for use by the operating system. The configuration data includes file paths referencing at least one of the files. The file paths are re-mapped based on the volume. The data is captured from the backup image using the database as mounted and the file paths as re-mapped.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
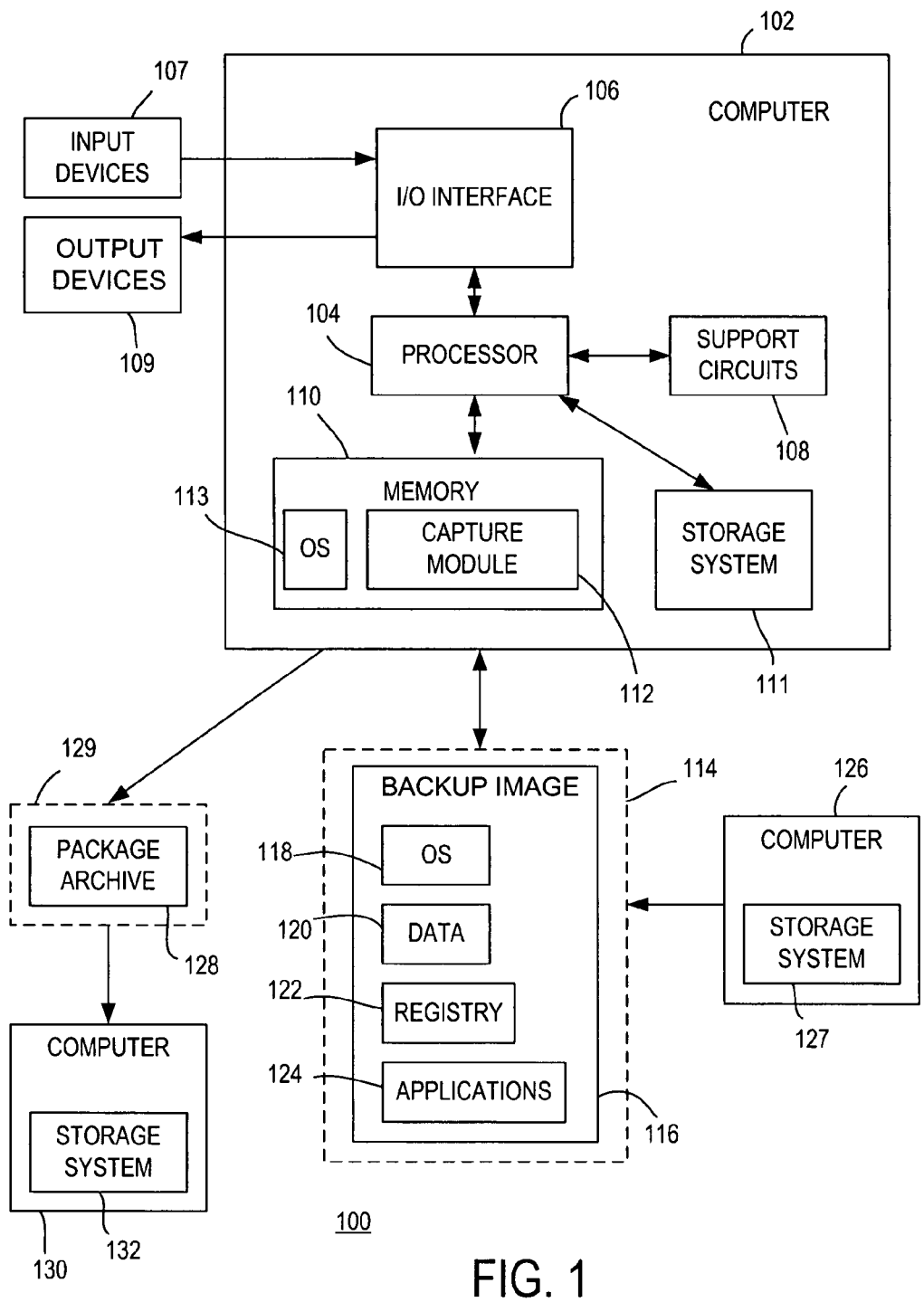
FIG. 1 is a block diagram depicting an exemplary embodiment of a computer system in accordance with one or more aspects of the invention.

FIG. 1 is a block diagram depicting an exemplary embodiment of a computer system 100 in accordance with one or more aspects of the invention. The computer system 100 includes a computer 102 and storage 114 having a backup image 116. The computer 104 illustratively includes a processor 104, a memory 110, various support circuits 108, an I/O interface 106, and a storage system 111. The processor 104 may include one or more microprocessors known in the art. The support circuits 108 for the processor 104 include conventional cache, power supplies, clock circuits, data registers, I/O interfaces, and the like. The I/O interface 106 may be directly coupled to the memory 110 or coupled through the processor 104. The I/O interface 106 may also be configured for communication with input devices 107 and/or output devices 109, such as network devices, various storage devices, mouse, keyboard, display, and the like. The storage system 111 may comprise any type of block-based storage device or devices, such as a disk drive system.

The memory 110 stores processor-executable instructions and/or data that may be executed by and/or used by the processor 104. These processor-executable instructions may comprise hardware, firmware, software, and the like, or some combination thereof. Modules having processor-executable instructions that are stored in the memory 110 may include a capture module 112. Operation of the capture module 112 is described below. The computer 102 may be programmed with an operating system 113, which may include OS/2, Java Virtual Machine, Linux, Solaris, Unix, HPUX, AIX, Windows, MacOS, among other known platforms. At least a portion of the operating system 113 may be disposed in the memory 110. The memory 110 may include one or more of the following random access memory, read only memory, magneto-resistive read/write memory, optical read/write memory, cache memory, magnetic read/write memory, and the like, as well as signal-bearing media as described below.

The storage 114 may comprise any type of block-based storage areas and may be implemented using any type of storage system, storage systems, or storage media, such as a disk drive, one or more tapes for a tape drive system, one or more compact discs (CDs), one or more digital versatile discs (DVDs), FLASH memory, or the like. Although the storage 114 is shown as being external to the computer 102, in some embodiments, the storage 114 may be internal to computer 102, such as an internal disk drive or the like as part of the storage system 111. In other embodiments, the storage 114 is internal to another computer, such as the computer 126 as part of a storage system 127. Elements of the computer 126 may be configured similar to the elements of the computer 102. For clarity, such elements of the computer 126 are omitted from FIG. 1.

The backup image 116 stores data organized into a file system. A file system refers to the structure and arrangement of files. For example, a file system typically includes a hierarchy of directories, each of which may contain one or more files. The files in the backup image 116 may comprise OS files 118, data files 120 (e.g., digital photos, documents, etc.), registry files 122, or application files (e.g., word processing application, spreadsheet application, photo editing application, etc.). The registry files 122 comprise a database that stores configuration data for use by the OS 118. An exemplary registry is the Windows registry in the Microsoft Windows operating systems. The configuration data may include settings, options, and the like for the OS 118 and the applications 124 for one or more users defined in the OS 118. As known in the art, the registry files 122 may include other information, such as hardware settings and the like.

The data in the backup image 116 originates from one or more target volumes in a computer. A "volume" is a block-based storage area implemented using one or more storage devices, such as one or more disk drives. In some embodiments, the data in the backup image 116 originates from volume(s) in the storage system 111 of the computer 102. In other embodiments, the data in the backup image 116 originates from volume(s) in another computer, such as volume(s) in the storage system 127 of the computer 126.

The capture module 112 is configured to capture data from the backup image 116. In some embodiments, the capture module 112 restores the captured data to one or more volumes in the storage system 111 of the computer 102. In other embodiments, the capture module 112 stores the captured data in a package archive 128. The package archive 128 may be embodied in a storage 129, which may be any type of storage system, storage systems, or storage media, such as a disk drive, one or more tapes for a tape drive system, one or more compact discs (CDs), one or more digital versatile discs (DVDs), FLASH memory, or the like. Although the storage 129 is shown as being external to the computer 102, in some embodiments, the storage 129 may be internal to computer 102, such as an internal disk drive or the like as part of the storage system 111. In other embodiments, the storage 129 is internal to another computer, such as the computer 130 as part of a storage system 132. Elements of the computer 130 may be configured similar to the elements of the computer 102. For clarity, such elements of the computer 130 are omitted from FIG. 1.

Figure 2:
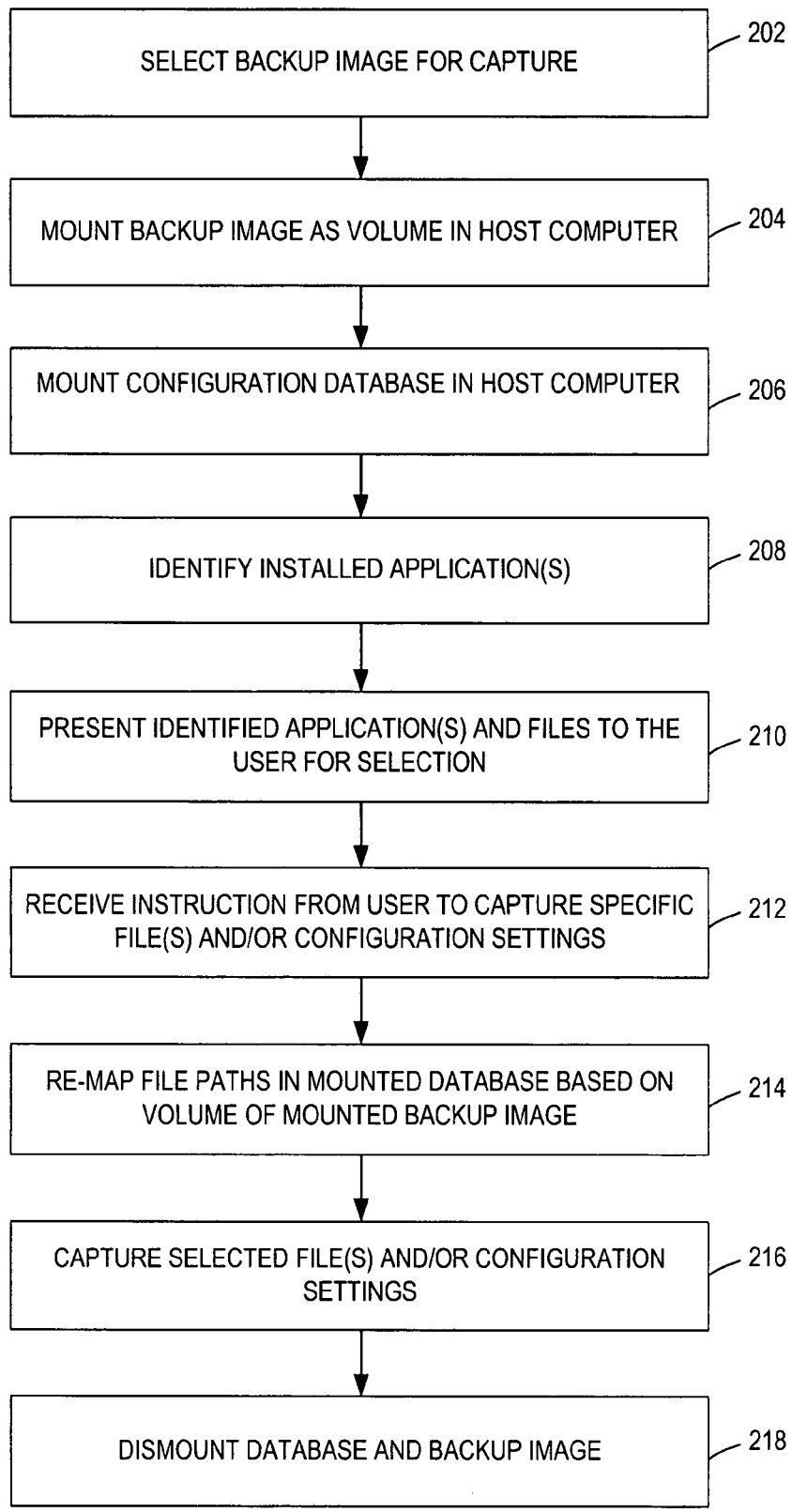
FIG. 2 is a flow diagram depicting an exemplary embodiment of a method for capturing data from a backup image in accordance with one or more aspects of the invention.

FIG. 2 is a flow diagram depicting an exemplary embodiment of a method 200 for capturing data from a backup image in accordance with one or more aspects of the invention. The method 200 may be performed by capture module 112 to capture data from the backup image 116. The method 200 begins at step 202, where a user selects a backup image for capture. In the context of the computer system 100, assume the user selects the backup image 116. At step 204, the backup image is mounted as a volume in a host computer. By "mount" it is meant that the backup image is presented to the OS 113 as an ordinary volume in the storage system. For example, in a Windows OS, the backup image may be accessible via a drive letter, such as "D". In the context of the computer system 100, the backup image 116 may be mounted as a volume in the storage system 111 of the computer 102.

At step 206, a database in the backup image is mounted. In the context of the computer system 100, the database represented by the registry files 122 may be mounted (i.e., opened for access). As described above, the database includes configuration data for use by the operating system 118. The configuration data comprises various options, settings, preferences, and the like for the operating system 118 and the applications 124 for one or more users of the operating system 118. Some of these settings, options, preferences, and the like include file paths that reference one or more files in the backup image. A "file path" is a path through the file system hierarchy to a file. For example, a file foo.doc may have a path of "C:\Documents and Settings\John\John's Documents" (for a user named "John"). The file paths in the database are referenced to the volume(s) from which the backup image was taken.

At step 208, one or more applications installed in the operating system of the backup image is/are identified. The application(s) may be identified based on configuration data in the mounted database and/or by analyzing files in the backup image (e.g., particular predefined directories can be searched to locate installed applications, such as C:\Program Files in a Windows OS). At step 210, the identified application(s) and files in the backup image are presented to the user for selection. The user can select individual files to be captured from the backup image, such as documents, digital photos, music files, video files, or any other of a myriad of different types of data files. In addition, the user can capture settings from the backup image. Settings may include any type of configuration file or configuration setting for the OS or any of the identified applications. In addition, settings may include entries or the like in the database (e.g., registry keys in a Windows registry). At step 212, an instruction is received from the user to capture specific files and/or configuration settings.

At step 214, file paths in the mounted database are re-mapped based on the volume of the mounted backup image. Notably, in some cases, the referenced volume(s) for the file paths in the database are different than the volume on which the backup image is currently mounted in the host computer. In the context of the computer system 100, the originating volume for the backup image 116 may have been "C", but the volume where the backup image 116 is mounted in the computer 102 may be "D". The file paths in the configuration data of the database refer to "C" and thus need to be re-mapped to "D". This allows any files referenced in the database to be retrieved from the mounted backup image in response to the files and/or configuration settings selected by the user. At step 216, the selected files and configuration settings are captured from the backup image. At step 218, the database and the backup image are dismounted.

Figure 3:
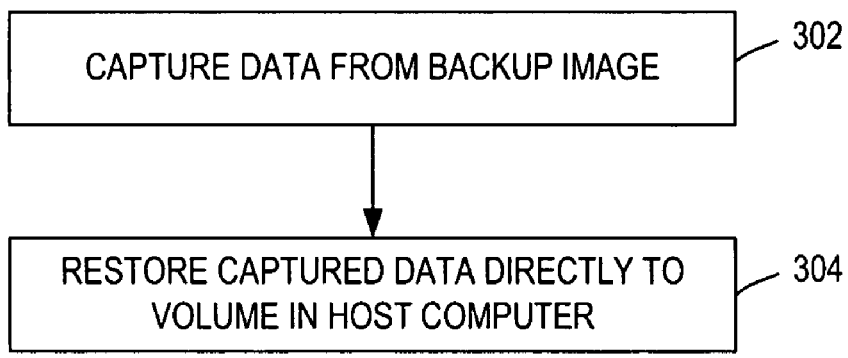
FIG. 3 is a flow diagram depicting an exemplary embodiment of a method for restoring data to a host computer in accordance with one or more aspects of the invention.

FIG. 3 is a flow diagram depicting an exemplary embodiment of a method 300 for restoring data to a host computer in accordance with one or more aspects of the invention. The method 300 may be used to restore data captured by the capture module 112 to the computer 102. The method 300 begins at step 302, where data is captured from the backup image. The data may be captured in accordance with the method 200 described above. At step 304, the captured data is restored directly to a volume in the host computer. In the context of the computer system 100, the captured data is restored directly to a volume in the storage system 111 of the computer 102.

Figure 4:
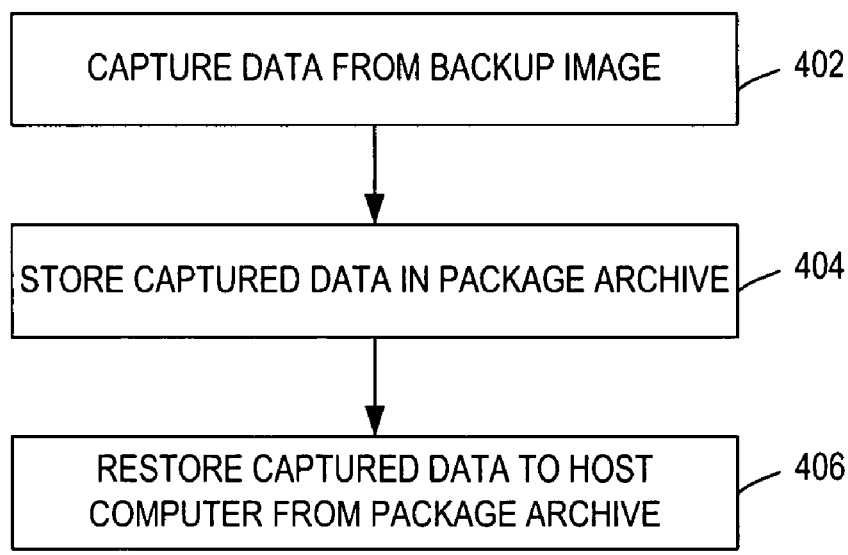
FIG. 4 is a flow diagram depicting an exemplary embodiment of a method for restoring data to a host computer in accordance with one or more aspects of the invention.

FIG. 4 is a flow diagram depicting an exemplary embodiment of a method 400 for restoring data to a host computer in accordance with one or more aspects of the invention. The method 400 may be used to restore data captured by the capture module 112 to the computer 102 or another computer, such as the computer 132. The method 400 begins at step 402, where data is captured from the backup image. The data may be captured in accordance with the method 200 described above. At step 404, the captured data is stored in a package archive. In the context of the computer system 100, the captured data may be stored in the package archive 128 on the storage 129. At step 406, the data is restored to the host computer from the package archive. For example, the data may be restored to a volume in the storage system 111 of the computer 102 from the package archive 128. Alternatively, the data may be restored to a volume in the storage system 132 in the computer 130 from the package archive 128.

Method and apparatus for capturing data from a backup image have been described. An automated mechanism is provided for mounting a particular backup image and capturing data therefrom, such as files, configuration settings, or the like. The captured data may be directly restored to a host computer, or stored in a package archive. The package file can be used to restore the captured data to a host computer. Since a backup image is used, the data capture described herein does not require the source of the data to be operational, i.e., the computer that previously stored the data. Moreover, while the backup image can be restored in its entirety, the data capture described herein also allows a user to select individual files and/or configuration settings from the backup image. Furthermore, the captured data can be restored to a dissimilar environment. For example, the data/settings may originate from one operating system in the backup image, but may be restored to a different operating system on the host computer (e.g., an upgraded version of the operating system). Thus, the invention provides non-destructive restoration of selected user files and/or settings to a new (dissimilar) hardware/software environment.

An aspect of the invention is implemented as a program product for use with a computer system. Program(s) of the program product defines functions of embodiments and can be contained on a variety of signal-bearing media, which include, but are not limited to: (i) information permanently stored on non-writable storage media (e.g., read-only memory devices within a computer such as CD-ROM or DVD-ROM disks readable by a CD-ROM drive or a DVD drive); (ii) alterable information stored on writable storage media (e.g., floppy disks within a diskette drive or hard-disk drive or read/writable CD or read/writable DVD); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct functions of the invention, represent embodiments of the invention.

While the foregoing is directed to embodiments of the present invention, other and further embodiments of the invention may be devised without departing from the basic scope thereof, and the scope thereof is determined by the claims that follow.

What is claimed is:

1. A method comprising:
    mounting a backup image as a backup mounted image, wherein
        the mounted backup image is mounted on a volume in a host computer,
        the mounted backup image comprises a plurality of copies of files copied from one or more originating volumes,
        the mounted backup image comprises file paths,
        the file paths are mapped to an originating file system of the originating volume(s),
        each of the file paths indicates at least one directory in the originating file system,
        the file paths are configured to be used by an originating operating system to reference the plurality of files in the originating volume(s),
        the mounted image further comprises one or more applications,
        the mounted image further comprises a plurality of application settings for the one or more applications, and
        each of the one or more applications is a copy of a respective original application on the one or more originating volumes;
    identifying a first application of the one or more applications on the mounted backup image;
    receiving an instruction to capture first application settings for the first application, wherein
        the plurality of application settings comprise the first application settings,
        the first application settings are usable by a second application,
        the host computer comprises a host operating system, and
        the second application is configured to be executed by the host operating system; and
    capturing data from the plurality of copies of files, wherein the capturing comprises
        capturing the first application settings.

2. The method of claim 1, further comprising:
    re-mapping the file paths as remapped file paths, wherein
        the re-mapped file paths are mapped to a file system of the volume for referencing at least one of the plurality of copies of files, and
        each of the remapped file paths indicates at least one remapped directory in the file system,
    wherein the capturing further comprises
        the remapped file paths being referenced by the host operating system to access the data.

3. The method of claim 1, further comprising:
    storing the data as captured in a package archive; and
    restoring the data as captured to another volume in the host computer or another host computer from the package archive.

4. The method of claim 1, further comprising:
    presenting at least one file of the plurality of copies of files related to the
        first application to a user for selection, wherein
        the mounted image further comprises application files,
        the application files comprise the plurality of application settings for the one or more applications, and
        the application files comprise the first application settings.

5. The method of claim 4, wherein
the second application is configured to access at least some of the data.

6. The method of claim 1, wherein
the mounted backup image comprises a database,
the database comprises a registry, and
the configuration data includes data for at least one user of the operating system.

7. The method of claim 1, wherein
the plurality of the copies of files in the backup image are referenced to the one or more originating volumes in the host computer or another host computer, and
the file paths are re-mapped from the one or more originating volumes to the volume.

8. An apparatus comprising:
means for mounting a backup image as a backup mounted image, wherein
the mounted backup image is mounted on a volume in a host computer,
the mounted backup image comprises a plurality of copies of files copied from one or more originating volumes,
the mounted backup image comprises file paths,
the file paths are mapped to an originating file system of the originating volume(s),
each of the file paths indicates at least one directory in the originating file system,
the file paths are configured to be used by an originating operating system to reference the plurality of files in the originating volume(s),
the mounted image further comprises one or more applications,
the mounted image further comprises a plurality of application settings for the one or more applications, and
each of the one or more applications is a copy of a respective original application on the one or more originating volumes;
means for identifying a first application of the one or more applications on the mounted backup image;
means for receiving an instruction to capture first application settings for the first application, wherein
the plurality of application settings comprise the first application settings,
the first application settings are usable by a second application,
the host computer comprises a host operating system, and
the second application is configured to be executed by the host operating system; and
means for capturing data from the plurality of copies of files, wherein
the means for capturing comprise means for capturing the first application settings.

9. The apparatus of claim 8, further comprising:
means for re-mapping the file paths as remapped file paths, wherein
the re-mapped file paths are mapped to a file system of the volume for referencing at least one of the plurality of copies of files, and
each of the remapped file paths indicates at least one remapped directory in the file system,
wherein the means for capturing further comprise
the remapped file paths being referenced by the host operating system to access the data.

10. The apparatus of claim 8, further comprising:
means for storing the data as captured in a package archive; and
means for restoring the data as captured to another volume in the host computer or another host computer from the package archive.

11. The apparatus of claim 8, further comprising:
means for presenting at least one file of the plurality of copies of files related to the first application to a user for selection, wherein
the mounted image further comprises application files,
the application files comprise the plurality of application settings for the one or more applications, and
the application files comprise the first application settings.

12. The apparatus of claim 11, wherein
the second application is configured to access at least some of the data.

13. The apparatus of claim 8, wherein
the mounted backup image comprises a database,
the database comprises a registry, and
the configuration data includes data for at least one user of the operating system.

14. The apparatus of claim 8, wherein
the plurality of the copies files in the backup image are referenced to the one or more originating volumes in the host computer or another host computer, and
the file paths are re-mapped from the one or more originating volumes to the volume.

15. A system, comprising:
a storage having a backup image, the backup image including files, a portion of the backup image comprising an operating system;
a host computer having a storage system and a data capture module, the data capture module configured to:
mount the backup image as a backup mounted image on a first volume in the storage system, wherein
the mounted backup image comprises a plurality of copies of files copied from one or more originating volumes,
the mounted backup image comprises file paths,
the file paths are mapped to an originating file system of the originating volume(s),
each of the file paths indicates at least one directory in the originating file system,
the file paths are configured to be used by an originating operating system to reference the plurality of files in the originating volume(s),
the mounted image further comprises one or more applications,
the mounted image further comprises a plurality of application settings for the one or more applications, and
each of the one or more applications is a copy of a respective original application on the one or more originating volumes;
identify a first application of the one or more applications on the mounted backup image;
receive an instruction to capture first application settings for the first application, wherein
the plurality of application settings comprise the first application settings,
the first application settings are usable by a second application,
the host computer comprises a host operating system, and
the second application is configured to be executed by the host operating system; and
capture data from the plurality of copies of files, wherein
the capturing comprises
capturing the first application settings.

16. The system of claim 15, wherein the data capture module is further configured to:
re-map the file paths as remapped file paths, wherein
the re-mapped file paths are mapped to a file system of the volume for referencing at least one of the plurality of copies of files, and
each of the remapped file paths indicates at least one remapped directory in the file system,
wherein the remapped file paths are configured to be referenced by the host operating system to access the data.

17. The system of claim 15, wherein the data capture module is further configured to:
store the data as captured in a package archive.

18. The system of claim 15, wherein the data capture module is further configured to:
present at least one file of the plurality of copies of files related to the first application to a user for selection, wherein
the mounted image further comprises application files,
the application files comprise the plurality of application settings for the one or more applications, and
the application files comprise the first application settings.

19. The system of claim 18, wherein
the second application is configured to access at least some of the data.

20. The system of claim 15, wherein
the mounted backup image comprises a database,
the database comprises a registry, and
the configuration data includes data for at least one user of the operating system.

\* \* \* \* \*